(No Model.) 5 Sheets—Sheet 1.

R. G. PETERS.
EVAPORATING APPARATUS.

No. 420,426. Patented Jan. 28, 1890.

(No Model.) 5 Sheets—Sheet 2.

R. G. PETERS.
EVAPORATING APPARATUS.

No. 420,426. Patented Jan. 28, 1890.

WITNESSES:
Fred G. Dieterich
P. B. Turpin

INVENTOR:
R. G. Peters
BY Munn & Co.
ATTORNEYS.

(No Model.) 5 Sheets—Sheet 3.

R. G. PETERS.
EVAPORATING APPARATUS.

No. 420,426. Patented Jan. 28, 1890.

WITNESSES:
Fred G. Dieterich
P. B. Turpin

INVENTOR:
R. G. Peters
BY Munn & Co.
ATTORNEYS.

(No Model.) 5 Sheets—Sheet 4.

R. G. PETERS.
EVAPORATING APPARATUS.

No. 420,426. Patented Jan. 28, 1890.

WITNESSES: Fred G. Dieterich
P. B. Turpin.

INVENTOR: R. G. Peters
BY Munn & Co.
ATTORNEYS.

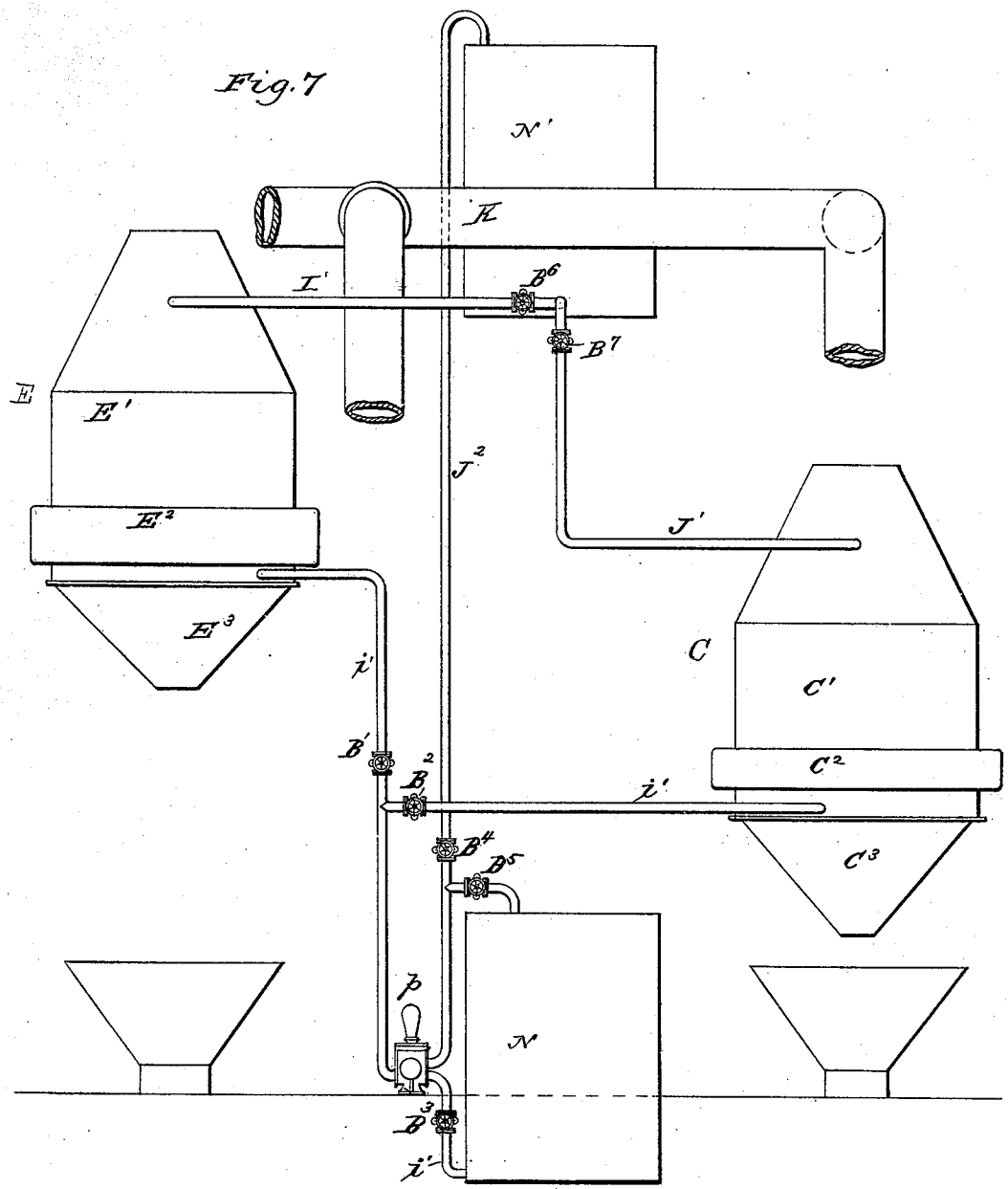

UNITED STATES PATENT OFFICE.

RICHARD G. PETERS, OF MANISTEE, MICHIGAN.

EVAPORATING APPARATUS.

SPECIFICATION forming part of Letters Patent No. 420,426, dated January 28, 1890.

Application filed September 27, 1887. Serial No. 250,871. (No model.)

*To all whom it may concern:*

Be it known that I, RICHARD G. PETERS, of Manistee, in the county of Manistee and State of Michigan, have invented a new and useful Improvement in Evaporating Apparatus, of which the following is a specification.

This invention is an improved apparatus for use in the manufacture of salt, and relates particularly to improvements in that class of such apparatus known as "multiple-effect evaporators," in which the heat of the vapors from one pan is utilized in subsequent pans or operations.

My invention seeks to secure the continuous operation of a salt-brine evaporator under vacuum by a continuous feed of brine and a continuous and uninterrupted discharge of salt precipitated, the vacuum being constantly sealed by immersion of the outlet of the discharge-pipe in a tank of brine, where the precipitated salt is received by the buckets of an endless carrier or elevator and elevated to the dripping-bins or to other means or appliance for drying the same.

The invention consists in certain features of construction and novel combinations of parts, as will be hereinafter described and claimed.

Figure 1:
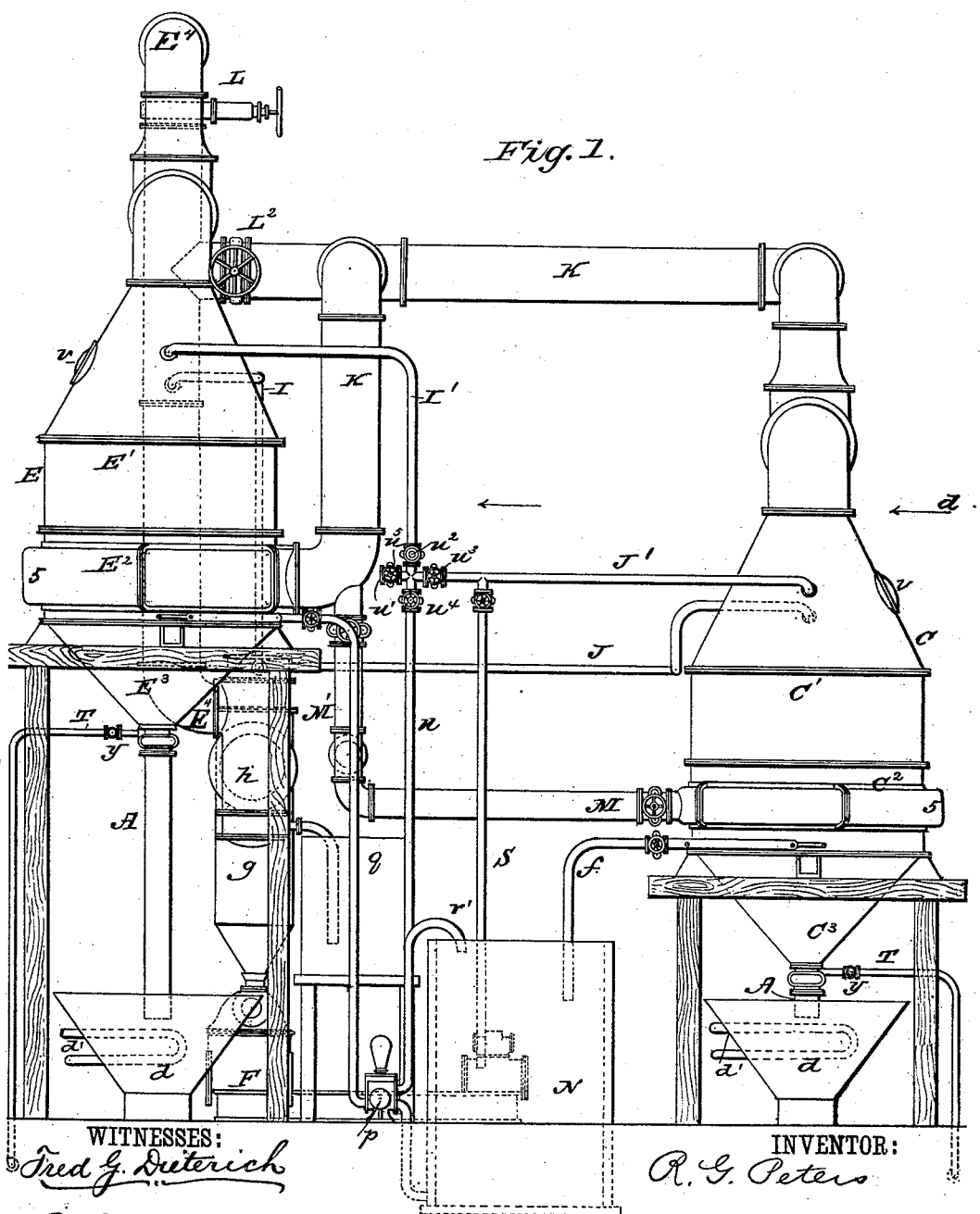
Figure 2:
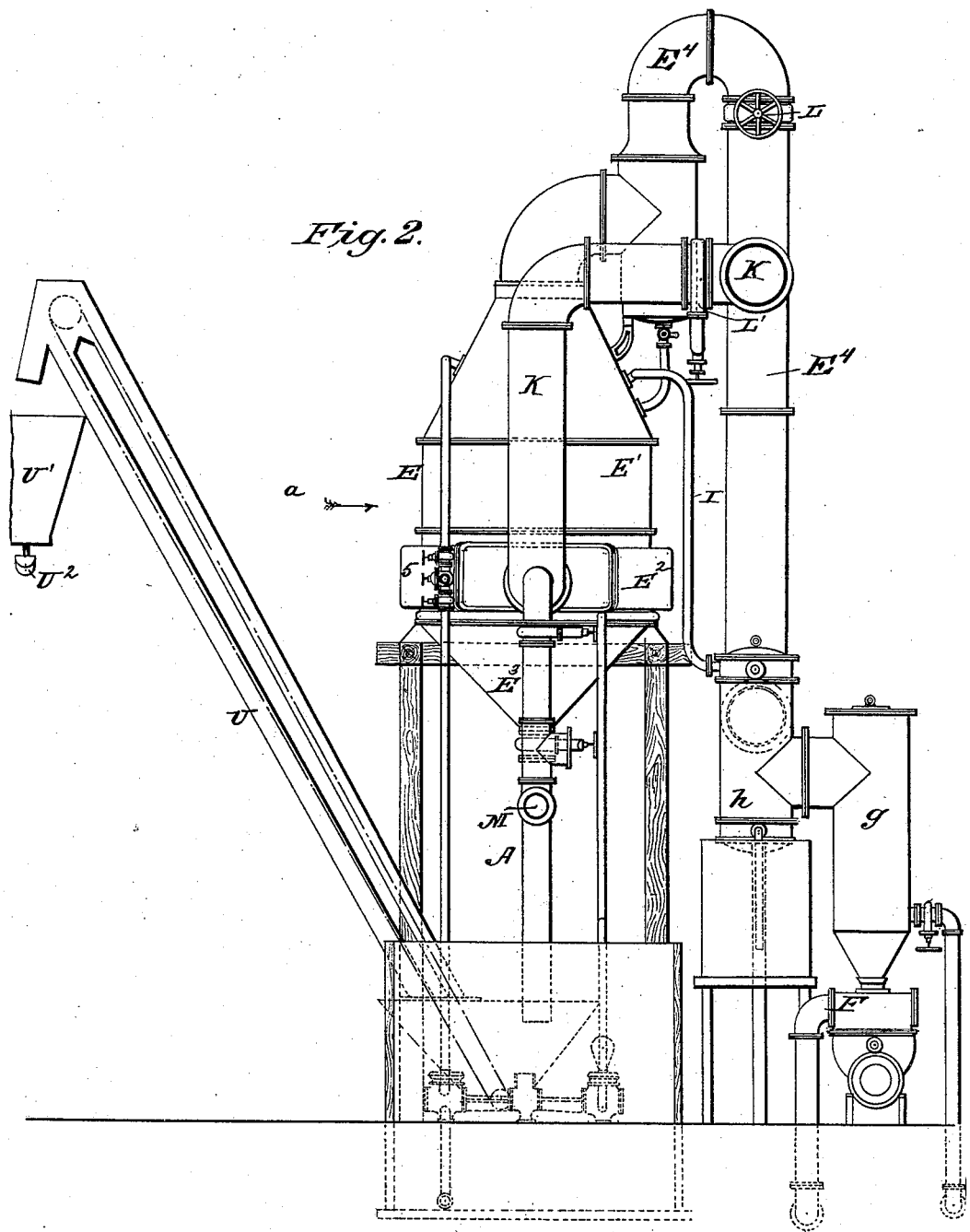
Figure 3:
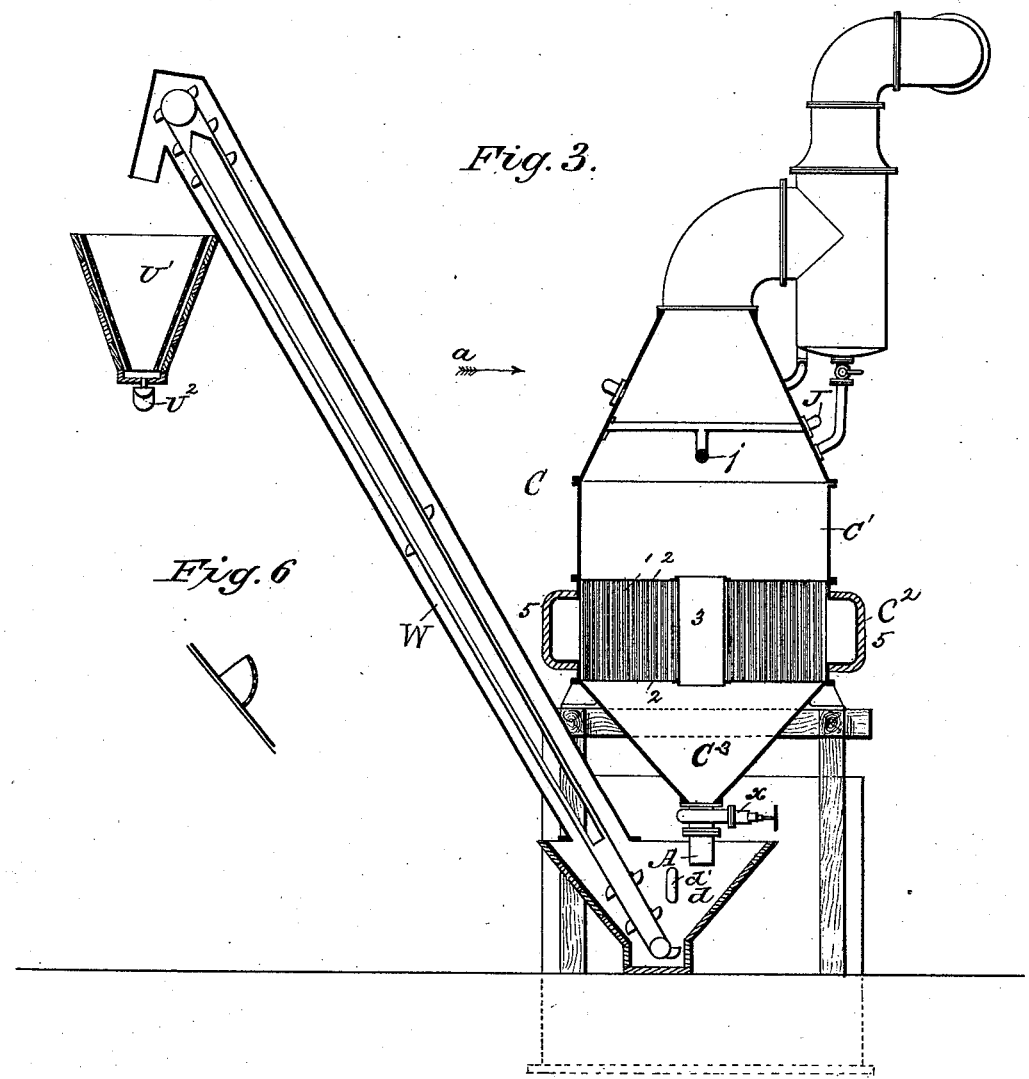
Figure 4:
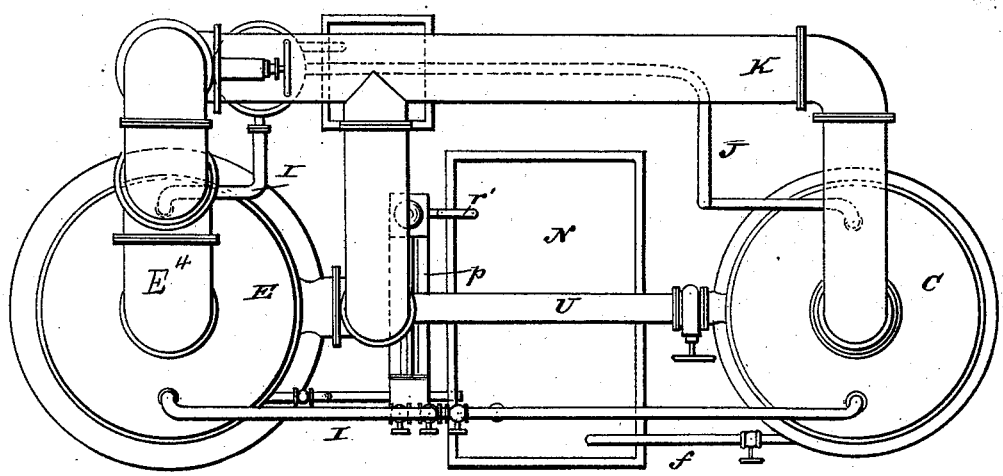
Figure 5:
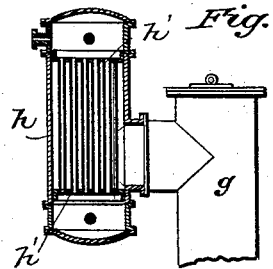

In the drawings, Figure 1 is a side elevation of the apparatus, looking in the direction of arrows $a$, Figs. 2 and 3, with the elevators removed. Fig. 2 is an end elevation, looking in the direction of the arrow $b$, Fig. 1, with the pan C removed. Fig. 3 is an end elevation showing the pan C in section, and looking in the direction of arrow D, Fig. 1, with the pan E removed. Fig. 4 is a top plan view of the apparatus. Fig. 5 is a detail sectional view illustrating the construction of the heater and condenser. Fig. 6 is a detail view, enlarged, of a part of the elevator; and Fig. 7 shows a somewhat different arrangement of some of the parts for washing out the pans.

The apparatus, as shown, comprises two vacuum-pans C and E, suitably supported, and each consisting of three parts $C'$ $C^2$ $C^3$ and $E'$, $E^2$, and $E^3$, the upper part of each being the dome, the second or middle part being the heating-belt, and the third or lower part being the funnel-shaped bottom for collecting and concentrating the flow of the salt precipitate, and terminating in the leg or discharge-pipe A, which is continuously sealed with brine contained in the hopper-shaped trough $d$.

The heating-belt consists of a section of the pan filled with a great number of copper tubes 1, arranged vertically and expanded in copper-tube heads 2 at top and bottom, a large central flue 3 being provided through the heating or tube belt proportioned to the entire diameter of the pan and of sufficient size to give a good and free circulation to the brine and to afford a ready downward passage for the salt precipitate through the tube-belt, below which it is concentrated by the funnel-shaped bottom of the pan, thus preventing the filling and clogging of the tubes in the tube-belt with the precipitate. The brine-inlet pipes I and J enter the domes E' and C' with horizontal portions, which pass entirely across the domes, and are made fast to the opposite sides thereof, and are provided with central downward discharges directly over the central flue 3 in the heating-belt, as shown at $j$ in Fig. 3, thereby aiding the circulation of the brine, as will be seen.

An approximately-perfect vacuum is maintained in the pan E by vacuum-pump F, which latter may be of any suitable construction. The vapor from the pan E is condensed in the jet-condenser $g$, in reaching which condenser the vapor passes through the heater $h$, which, as shown, consists of a large number of copper tubes expanded in tube-heads near the top and bottom of the heater. Through these copper tubes in the heater $h$ the brine to be evaporated is drawn by force of the vacuum, passing through the pipe I into the dome of pan E and through the pipe J into the dome of pan C. The vapor from the pan E, passing among and around these tubes in the heater $h$ within the chamber formed between plates $h$ $h'$ of such heater, raises the temperature of the brine passing through the heater to very near the boiling-point, and thus heated it is fed to pans E and C through pipes I and J. The apparatus thus utilizes a part of the heat of the vapor from pan E in preparing the brine for evaporation upon its introduction into the pans.

Jackets 5 are provided surrounding the heating-belts of each pan and communicating therewith to render the circulation of the steam or vapor within said belt even and uniform. The pipes conveying the steam or vapor to these belts open into the jackets 5, as shown. The steam or vapor supplying the heat to the heating-belt of pan E is generated in the pan C and passes over in pipes K and connects with the heating-belt of pan E and with the vapor-pipe $E^4$ below or beyond the valve L therein. The valves L, L', and $L^2$ are so arranged that the vapor from pan C may be directed either into the heating-belt of pan E, when both pans are to be operated, or directly to heater $h$ and vacuum-pump F, thus rendering it practical to work either pan separate from the other, or to work both at the same time.

The heating vapor or steam is supplied to the pan C by the pipe M, and may be live steam from the boilers or exhaust-steam from the engine, as desired. The pipe M, or a branch M' thereof, is also carried to the heating-belt of pan E, so that such pan E can be operated independently of pan C, if desired. The brine circulating through the tubes of the heating-belt receives and takes up the heat of the steam passing around said tubes and condenses the steam or vapor, and the water so formed will fall to the bottom of the heating-belt, whence it is led through pipes $f$ and $q$ into the vat or tank N. This water of condensation will retain a temperature according to the degree of heat in the heating-belt, being approximately 128° Fahrenheit in pan E, and 180° Fahrenheit in pan C, and in quantity the water of condensation will usually equal or exceed in amount the quantity of brine evaporated, and will be utilized in washing down and removing the deposits from the interior of the pans as often as may be found necessary. The water of condensation from pan C will be carried to the tank N by the pressure of the live steam in the heating-belt of that pan; but there being a partial vacuum in the heating-belt of pan E, when the latter is operated in conjunction with the pan C, the water of condensation will be drawn from that belt by the pump $p$ through pipe $q$ and discharged into tank N through pipe $r'$.

To wash out the pans by the aid of the construction shown in Fig. 1, after the tank N has been properly filled the gate-valves in pipes I', J', and S may be opened, when the vacuum in the pans will draw the water from tank N thereinto.

In washing out the inside of the pans I may use an upper tank N' in connection with the lower tank N, as shown in Fig. 7, the upper tank N' being placed at any convenient height above the steam-belts $C^2$ and $E^2$ of the pans, into which tank the hot water of condensation is pumped by pump $p$ through the pipe $J^2$, preparatory to being drawn by gravity and the vacuum in the pans at any time through the pipes I' and J' and violently injected into the pans E and C, thereby removing any scale, dirt, or foreign matter adhering to the internal surface of the pans.

To further facilitate the above-described operation, I attach to upper tank N' or hot-water pump $p$ a flexible hose (not shown in drawings) to be used for the above purpose through the hand-holes V V in domes in connection with the fixed pipes I', J', and $J^2$.

The operation of pump $p$ in connection with the tanks N N' for washing out pans C' and E' is as follows: The pump $p$ in the ordinary course of making salt has valves B' $B^2$ open and valve $B^3$ shut, all on the suction side in pipes $i'$, and the valves $B^4$ shut and valve $B^5$ open on the delivery side of pump $p$, and with the said valves placed as described will proceed to draw the hot water of condensation from tube-belts $E^2$ and $C^2$ of pans E and C and discharge the same into lower tank N, to be carried from there by ordinary waste and overflow pipes, (not shown in drawings,) or to steam-boilers, as required, after the tank N has been properly filled to the required height for washing-out purposes. Now, having run the pans C and E on salt-making the required time, preparation must be made to wash out, to which end I close valve $B^5$, retaining lower tank N full of hot water, and open valve $B^4$, when the upper tank N' will be filled through pipe $J^2$. When the upper tank N' is filled, I open valve $B^6$ or $B^7$ or both of them, and so violently inject the hot-water of condensation into pans C and E by gravity accelerated by the vacuum through pipes I' and J' and flexible hose. (Not shown in drawings.) At the time of my starting to use the hot water from upper tank N', I close valves B' and $B^2$ and open valve $B^3$, all on the suction side of pump $p$, also open valve $B^4$ and close valve $B^5$, then start pump $p$ and draw the hot water from lower tank N and force it through pipe $J^2$ into upper tank N', thereby doubling the capacity of upper tank N' for washing-out purposes.

The tank N should be of sufficient size to fill the pan to be washed down above the point at which the brine ordinarily stands in evaporating, and when so filled the steam should be turned on and the water boiled briskly for the purpose of washing off the gypsum and other deposits which may adhere to the tube and sides of the pan.

During the process of washing to prevent the sediment in the pan from entering the hopper-shaped trough $d\ d$ and coming in contact with the elevating apparatus below the pans, the valve X should be closed and the wash-water then drawn off from above the valve through the washout-pipe T, which pipe should be of sufficient capacity to draw the water off quickly, producing a strong downward draft through the pan and tubes of the heating-belt. When the wash-water and sediment have thus been drawn out of the pans C and E, the remainder of the hot water of condensation may be thrown by means of the pressure of pump $p$ or other convenient power through the pipe $u$ and a flexible hose or tube be attached to said pipe at $u'$ (the valves $u^2$, $u^3$, $u^4$, and $u^5$ being properly manipulated) and inserted through the man-holes $v$ in the domes to direct the water against the interior of the pans and through the small tubes in the heating-belt, so as to remove any scale or sediment that may adhere, the valve X being kept closed and the valve $y$ open during the operation. The side valve $y$, through which the wash-water is withdrawn, should be placed as near the seat of the valve $x$ as possible, in order to effect the best possible drainage of the wash-water and sediment. The pans being put in operation by the vacuum-pump and the boiling of the brine in contact with the heating-belts, which tends to produce an upward current of the brine in the small tubes, a very rapid evaporation takes place in the dome, where a nearly-perfect vacuum exists, and a very rapid crystallization results and precipitation of the salt, which is carried downward chiefly through the large central flues in the tube-belts, and is concentrated in the funnel-shaped bottoms of the pans. The valve X being open, the salt slides continuously down the legs or discharge-pipes A, which are sealed by the brine in the hopper-shaped troughs $d$, whence it is taken up by the elevators U into the bins U', which have perforated linings, through which the liquid held by the salt is drained off by the gutters $U^2$ $U^2$.

The elevator, it will be seen, operates within the trough and has its buckets perforated or foraminous, so that the brine will drip therefrom.

To direct the brine back into the trough, I provide a gutter W, to receive the drippings from the buckets and convey them back into the trough, the gutter being in the construction shown a part of the casing of the elevator.

It will be noticed that I arrange the pans C and E one lower than the other, so that the degree of vacuum maintained in each will balance the column of brine standing in the pan above the surface of the brine in the trough, thus securing a free and continuous discharge of salt through the leg-pipe under the surface of the brine in the trough.

In order to keep the brine in the sealing-troughs $d$ at about boiling-heat, I provide a steam pipe or pipes $d'$, suitably connected with the boiler or other suitable source of supply of live steam and disposed in the tanks under the surface of the brine therein. The object of this is to have the salt when taken out as hot as possible, which causes the salt to dry quickly, whereas, if the salt were taken out of cold brine, artificial means would be required to dry it, as will be readily understood.

It is manifest that the particular disposition of the steam-pipes in the troughs may be varied.

Having thus described my invention, what I claim as new is—

1. In an apparatus substantially as described, the combination, with the pan having a depending leg-pipe and a trough below said pipe, of a heater whereby to heat the contents of said trough, all substantially as and for the purposes set forth.

2. In an apparatus substantially as described, the combination, with a pan having a heating-belt and a vapor pipe or pipes communicating with said belt, of a tank, a pipe by which to conduct the water of condensation from the heating-belt to said tank, and a pipe or pipes through which the water may be carried from said tank into the dome or evaporating-chamber of the pan, whereby to wash out the same, substantially as set forth.

3. The combination of the pan E, having a vapor-pipe $E^4$ and a valve L therein, a heater with which such vapor-pipe communicates, the pan C, the vapor-pipes K, which connect with the heating-belt of pan E and with the pipe $E^4$, below or beyond the valve L therein, and valves L' and $L^2$, substantially as and for the purposes specified.

4. In an apparatus substantially as described, the combination of two pans having their outlets or discharges disconnected, whereby they may discharge independently, and troughs receiving said outlets or discharges, whereby they may be liquid-sealed, the said pans being arranged one lower than the other, whereby the degree of vacuum maintained in each will balance the column of brine therein above the surface of the brine in the trough, and pipes connecting the vacuum-chambers of said pans, all substantially as described, whereby to secure a free and continuous discharge of salt under the surface of the brine in the troughs, substantially as set forth.

5. The combination, in an apparatus substantially as described, of the pan having a heating-belt, the tank N, the pipe for conveying the water of condensation from the heating-belt of the pan to the tank, a pipe or pipes by which to convey the water from said tank to the pan for the purpose of washing out the said pan, and a pump, as $p$, all substantially as and for the purposes specified.

6. In an apparatus substantially as described, the combination of the pans C E, having heating-belts, the vapor-pipe $E^4$, extending from pan E and having a valve L, the vapor-pipes K, for conducting the vapor from the pan C and arranged to communicate with the heating-belt of pan E and with the vapor-pipe $E^4$, valves L L' $L^2$, whereby the vapor from pan C may be shut off from said pipe $E^4$ and from the belt of pan E and the heating-pipe M, leading to the belt of pan C, and having a branch M', whereby to conduct heat to pan E, and valves controlling the passage of heat through pipe M and its branch M', substantially as and for the purposes specified.

7. In an apparatus substantially as described, the combination of two pans and connections between and troughs below the same, said pans being arranged one lower than the other, whereby the degree of vacuum maintained in each will balance the column of brine standing in the pan above the surface of the brine in the troughs, whereby to secure a free and continuous discharge of salt under the surface of the brine, substantially as set forth.

8. In an apparatus substantially as described, the combination of the pan having a discharge leg or pipe, the open trough into which the discharge end of such leg or pipe extends, a heater whereby the temperature of the brine in said trough may be raised, and an elevator or conveyer extended into such trough, whereby to remove the precipitate therefrom, substantially as and for the purposes specified.

9. In an apparatus substantially as described, the combination of the pans C E, having heating-belts, the heater $h$, and condenser $g$, the vapor-pipe $E^4$, connected with pan E and leading thence to the heater $h$, the pipe K, extended from pan C and having branches connected with the pipe $E^4$ and with the heating-belt of pan E, and the valves L, L', and $L^2$, whereby the vapors from pan C may be discharged into the heating-belt of or the vapor-pipe of the pan E, substantially as set forth.

10. In an apparatus substantially as described, the combination of the vacuum-pan having a depending leg-pipe with a trough below said leg-pipe, and a steam pipe or pipes disposed in said trough, substantially as and for the purposes specified.

RICHARD G. PETERS.

Witnesses:
FRANK H. SMITH,
LOUIS J. SIMON.